United States Patent Office 3,559,474
Patented Feb. 2, 1971

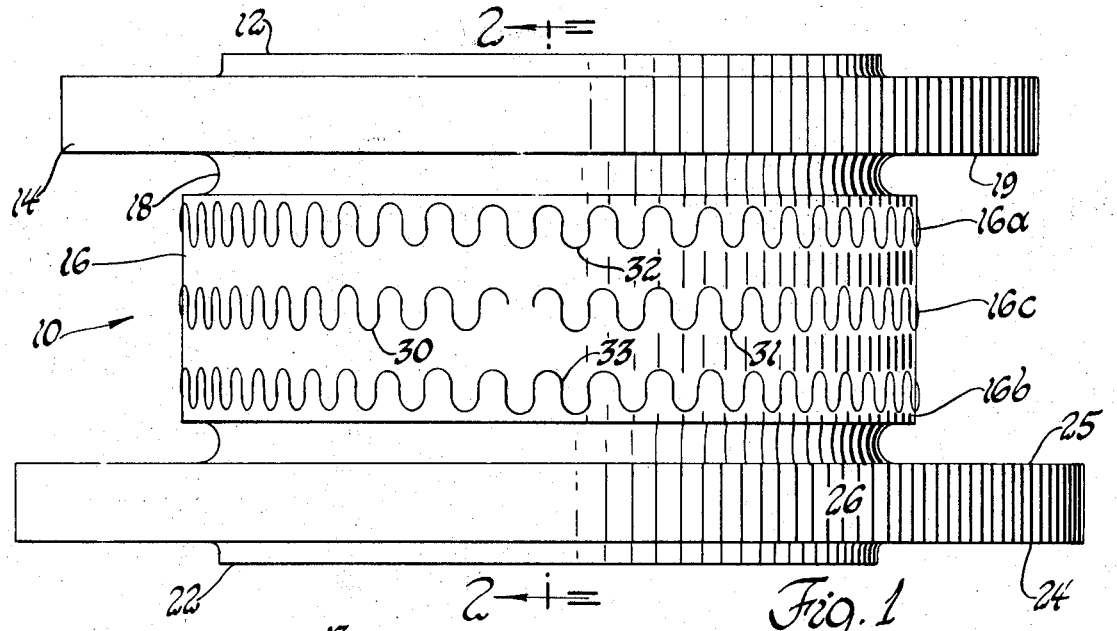
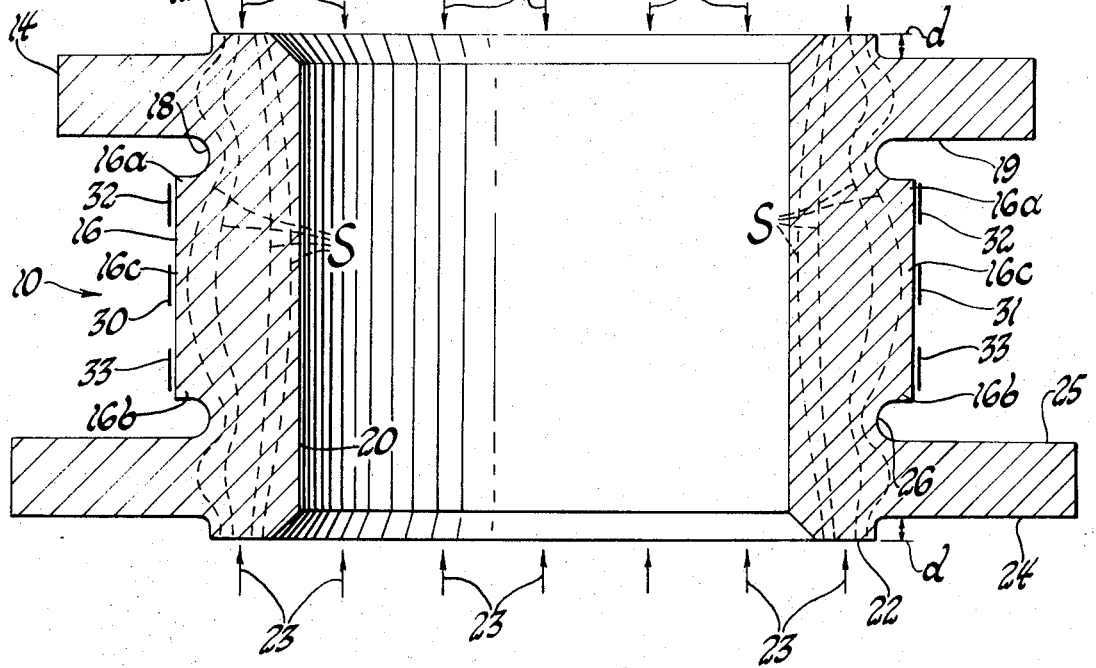

3,559,474
FORCE TRANSDUCER LOAD CELL
Ismail Macit Gurol and Ralph S. Shoberg, Farmington, Mich., assignors to GSE, Inc., Farmington, Mich., a corporation of Michigan
Filed Oct. 8, 1968, Ser. No. 765,946
Int. Cl. G01l 1/22
U.S. Cl. 73—141                            14 Claims

ABSTRACT OF THE DISCLOSURE

A force transducer load cell comprising a body having a pair of bearing surfaces at its opposite ends for engagement by load applying members to place the body in compression. A pair of outwardly projecting fins are provided on the body, one adjacent each bearing surface, having sufficient strength for restraining the bearing surfaces against transverse strain to substantially eliminate relative sliding movement, and friction resulting therefrom, between the bearing surfaces and the surfaces of the load applying members in contact therewith.

---

This invention relates generally to force measuring devices and is particularly concerned with the construction of force transducer load cells by means of which forces can be measured in accordance with the amount of strain imposed by the force on the load cell.

A common method of measuring forces on bolts and similar devices is to clamp a load cell of known load-strain characteristics between the bolt head and a clamping surface. Strain gages attached to the load cell measure the strain on the load cell caused by the clamping force of the bolt, and since the characteristics of the load cell are known, the force applied to the load cell by the bolt can be determined.

When an elastic body is subjected to a load along one axis, the body tends to change dimensions, or undergo strain, both in the direction of the load and in a direction transverse to the load. The lateral or transverse strain is sometimes referred to as Poisson strain. When a member engages a bearing surface of a load cell to apply a load to the load cell, frictional forces are frequently caused by the tendency of the load cell bearing surface to undergo transverse strain and thereby slide relative to the surface of the load applying member. For example, when a load cell is placed in compression by a bolt or similar fastener, the bearing surface engaged by the head of the bolt will tend to expand radially or transversely. The head of the bolt will not be loaded in compression, and a washer between the bolt head and load cell bearing surface will not be uniformly loaded. Moreover, the material of the member in contact with the load cell bearing surface may have stress-strain characteristics different from that of the load cell. Consequently, the load cell bearing surface will tend to slide transversely with respect to the contacting surface of the load applying member due to the differences in loading, stress distribution, material, and Poisson strain characteristics; and the sliding movement will be resisted by frictional forces between the surfaces in contact with each other. The magnitude of the frictional forces is dependent upon various factors including type of material, surface finishes, and surface hardness; and is therefore highly unpredictable. Consequently, the frictional forces introduce errors into the measurement of strain on the load cell.

Various attempts have been made to solve this problem. One approach has been to introduce a washer having low friction surfaces between the contacting surfaces of the load cell and force applying member, the washer serving as a solid lubricant, in order to reduce or control the friction forces. However, this method, at best, reduces the amount of error but does not eliminate it, and does not alter the fact that the frictional forces will vary with the magnitude of the clamping force, and with the quality and quantity of the lubricant material.

It is, therefore, an object of this invention to provide a load cell for a force transducer in which the tendency of the bearing surface of the load cell to undergo transverse strain or dimensional changes is substantially eliminated such that the response of the load cell is independent of the condition of the contacting surfaces of the load cell and the member applying force thereto.

Another object is to provide a force transducer load cell so constructed that frictional forces between the contacting surfaces of the load cell and the member applying a force thereto are substantially eliminated.

In carrying out the foregoing, and other objects, a load cell according to the present invention includes restraining means for substantially preventing any bearing surface of the load cell from changing dimensions in a transverse direction to loads applied thereto. In the embodiment described in detail below, fins project outwardly from the body of the load cell adjacent the bearing surfaces, the fins being of sufficient strength to restrain the bearing surfaces against dimensional changes transverse to the load applied to the cell when the load is insufficient to strain the load cell beyond its elastic limit.

Other objects, features and advantages of the invention will become apparent from the following description taken in connection with the accompanying drawings in which:

FIG. 1 is an elevational view of a load cell constructed according to the invention; and FIG. 2 is a sectional view of the load cell shown in FIG. 1.

A force transducer load cell is shown in the drawings comprising a body 10 having a bearing surface 12 for engagement with a load applying member such as a bolt or similar fastener to apply a load to the bearing surface in a direction normal thereto as indicated by arrows 13; and restraining means 14 on body 10 for restraining the bearing surface 12 against dimensional changes in a direction transverse to the load 13 without interfering with strain in the remaining portion 16 of body 10. The restraining means 14 comprises a fin projecting outwardly from body 10 near the bearing surface 12. The fin 14 is of sufficient strength to substantially prevent transverse dimensional changes in the bearing surface 12 when the load 13 applied by the load applying member is insufficient to strain the body 10 beyond the elastic limit.

The load cell shown in FIGS. 1 and 2 is of a type wherein the body 10 is placed in compression by application of a load to the bearing surface 12, and the fin 14 is spaced axially from the bearing surface 12 so as to be out of engagement with a load applying member engaging the bearing surface 12. A peripheral groove 18 is provided in body 10 at the juncture of fin 14 and the body 10 on the side 19 of fin 14 opposite the bearing surface 12.

The body 10 of the load cell shown in the drawings is circular, and the inner diameter of groove 18 is substantially the same as, or at least as large as, the outer diameter of the bearing surface 12 to prevent the application of bending stresses on fin 14 by the load on bearing surface 12. An axial opening 20 is provided in body 10 which may receive a load applying member such as the shank of a bolt or similar fastener.

In the illustrated embodiment, the body 10 has a second bearing surface 22 parallel with bearing surface 12. Thus, when the load cell is placed between a bolt head and workpiece, for example, with the bolt head engaging bearing surface 12 and the workpiece engaging bearing surface 22, body 10 is placed in compression, and fins 14 and a similar fin 24 adjacent bearing surface 22 prevent Poisson expansion of the respective bearing surfaces. A groove 26 similar to groove 18 is also provided at the juncture of fin 24 with body 10 on the side 25 of fin 24 opposite bearing surface 22. Fin 24 is also preferably spaced axially from the bearing surface 22 so as not to be engaged by the member applying load to bearing surface 22 as indicated by arrows 23.

Reference numeral 16 designates the central portion of the body 10 that extends between grooves 18 and 26. Reference numerals 16a and 16b designate the edge portions of the central portion 16 adjacent grooves 18 and 26, respectively; and reference numeral 16c designates the mid-portion of the central portion 16. When the body 10 is subjected to compression forces as indicated by arrows 13 and 23, maximum strain will take place at the mid-portion 16c, and the sensitivity will decrease toward the edge portions 16a and 16b. Grooves 18 and 26 act to, in effect, "de-couple" portions 16a and 16b from the stress imposed on body 10 by the forces indicated by arrows 13 and 23 such that portions 16a and 16b are virtually strain-free. The stress pattern resulting from forces acting on body 10 in the direction of arrows 13 and 23 is indicated by the broken lines S in FIG. 2. Thus, strain sensitive elements will be subjected to maximum deformation when located at the mid-portion 16c.

Strain sensitive elements are indicated at 30, 31, 32 and 33, the elements being connected in a typical Wheatstone bridge circuit. As shown, these elements are conventional resistance strain gages but, of course, other types of strain sensing devices, such as semiconductor strain sensitive elements, would be suitable. Elements 32 and 33 each extend entirely around the circumference of the central portion of body 10 in the unstrained areas 16a and 16b, respectively. Elements 30 and 31 each extend substantially half way around the circumerence at the mid-portion 16c. Elements 32 and 33, being located on strain free surfaces, change resistance only in response to temperature changes, and thus maintain the circuit balanced independently of temperature changes on the body. The Wheatstone bridge circuit will thus become unbalanced only in response to strain-induced deformation of elements 30 and 31 resulting in a change in the resistance of elements 30 and 31.

While a specific example of the invention is illustrated in the accompanying drawings and described in the foregoing specification, it should be understood that the invention is not limited to the exact construction shown, but that various alternative constructions, all falling within the scope and spirit of the invention will be apparent to those skilled in the art.

The embodiments of the invention in which an exclusive property or privilege is claimed are defined as follows:

1. A force transducer load cell comprising: a body having at least one bearing surface for engagement with a load applying member for applying load to the bearing surface in a direction normal thereto; restraining means on said body for restraining said bearing surface against dimensional changes in a direction transverse to the load without interfering with strain in the remaining portion of said body; and a peripheral groove in said body adjacent said restraining means on the opposite side of said restraining means from said bearing surface to define a strain free portion on said body adjacent said groove.

2. A force transducer load cell comprising: a body having a pair of bearing surfaces at its opposite ends adapted to be engaged by load applying members to place the body in compression; axially spaced restraining means on said body for restraining each of said bearing surfaces against transverse strain; said body having an unrestrained strain gage portion intermediate said bearing surfaces free to strain in response to loads applied to said bearing surfaces; and grooves formed in said body adjacent said restraining means and at the opposite ends of said strain gage portion to define strain-free surfaces on said strain gage portion adjacent said grooves for receiving temperature compensating strain sensitive elements.

3. A transducer comprising: a body having bearing surfaces at its opposite ends for engagement with load applying members for applying a load to the bearing surfaces in a direction normal thereto; a pair of axially spaced fins projecting outwardly from the body with one of the fins located near each bearing surface for restraining the respective bearing surface against dimensional changes in a direction transverse to the load applied thereto without interfering with strain in the portion of the body located between said fins; each of said fins being spaced axially from its respective bearing surface so as to be out of engagement with a load applying member engaging said respective bearing surface; each of said fins being of sufficient strength to prevent transverse dimensional changes in the respective bearing surface when the load applied by the load applying members is insufficient to strain the body beyond the elastic limit thereof; a pair of axially spaced peripheral grooves formed in said body, each of said grooves being located between said fins and at the juncture of one of said fins and said body, said body having a central portion extending between said grooves with the edge portions of said central portion adjacent said grooves defining strain-free surfaces and the mid-portion of said central portion defining the area of maximum strain.

4. A transducer as claimed in claim 3 including at least one temperature compensating strain sensitive element located on each of said strain-free surfaces and a pair of strain sensitive elements located on said area of maximum strain, said strain sensitive elements being connected in a Wheatstone bridge circuit.

5. A force transducer load cell as claimed in claim 1 wherein said restraining means comprises a fin projecting outwardly from the body near the bearing surface, said fin being of sufficient strength to prevent transverse dimensional changes in the bearing surface when the load applied by the load applying member is insufficient to strain the body beyond the elastic limit.

6. A force transducer load cell as claimed in claim 5 wherein said body is placed in compression by application of a load to said bearing surface and said fin is spaced axially from said bearing surface so as to be out of engagement with a load applying member engaging said bearing surface.

7. A force transducer load cell as claimed in claim 6 wherein said body is circular and the inner diameter of said groove is at least as large as the outer diameter of said bearing surface to prevent the application of bending stresses on said fin by the load on said bearing surface.

8. A force transducer load cell as claimed in claim 7 further including an axial opening in said body.

9. A force transducer load cell as claimed in claim 1 further including an axial opening in said body.

10. A force transducer load cell as claimed in claim 2 wherein said body is cylindrical and further including an axial opening extending through said body.

11. A force transducer load cell as claimed in claim 10 wherein said restraining means comprises a pair of fins projecting outwardly from said body, each located adjacent one of the bearing surfaces.

12. A force transducer load cell as claimed in claim 11 wherein said grooves extend peripherally at the juncture of said body with each of said fins, each of said grooves being located on the opposite side of its associated fin from the respective bearing surface.

13. A force transducer load cell as claimed in claim 12 wherein said fins are each spaced axially from their respective bearing surfaces a distance sufficient to remain out of engagement with a load applying member engaging the associated bearing surface.

14. A force transducer load cell as claimed in claim 13 wherein the inner diameter of each of said grooves is at least as large as the outer diameter of its associated bearing surface.

References Cited

UNITED STATES PATENTS

| 2,487,595 | 11/1949 | Ruge | 73—141 |
| 2,493,029 | 1/1950 | Ramberg | 201—63 |
| 2,576,417 | 11/1951 | Ruge | 201—63 |
| 2,775,887 | 1/1957 | Hines | 73—141 |
| 2,855,489 | 10/1958 | Ruge | 201—48 |
| 2,867,707 | 1/1959 | MacDonald | 201—63 |

RICHARD C. QUEISSER, Primary Examiner

J. WHALEN, Assistant Examiner

U.S. Cl. X.R.

338—5